(12) United States Patent
Weston et al.

(10) Patent No.: US 7,413,924 B2
(45) Date of Patent: Aug. 19, 2008

(54) PLASMA ETCH PROCESS FOR DEFINING CATALYST PADS ON NANOEMISSIVE DISPLAYS

(75) Inventors: Donald F. Weston, Phoenix, AZ (US); William J. Dauksher, Mesa, AZ (US); Emmett M. Howard, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 176 days.

(21) Appl. No.: 11/263,793

(22) Filed: Oct. 31, 2005

(65) Prior Publication Data

US 2007/0099336 A1    May 3, 2007

(51) Int. Cl.
*H01L 51/40*    (2006.01)
(52) U.S. Cl. .................... 438/99; 977/742; 257/E51.04
(58) Field of Classification Search ......... 977/937–939; 438/99
See application file for complete search history.

(56) References Cited

U.S. PATENT DOCUMENTS

| | | | | |
|---|---|---|---|---|
| 5,849,639 A | * | 12/1998 | Molloy et al. ............... | 438/714 |
| 5,882,489 A | * | 3/1999 | Bersin et al. ........... | 204/192.35 |
| 6,000,980 A | | 12/1999 | Baldi et al. | |
| 6,739,932 B2 | | 5/2004 | Yaniv et al. | |
| 6,812,480 B2 | | 11/2004 | Lee et al. | |
| 7,052,588 B2 | * | 5/2006 | Gu et al. ................. | 204/403.01 |
| 7,071,113 B2 | * | 7/2006 | Kim et al. .................... | 438/706 |
| 2003/0059968 A1 | | 3/2003 | Cheng et al. | |
| 2004/0227447 A1 | | 11/2004 | Yaniv et al. | |
| 2005/0112983 A1 | * | 5/2005 | Park ........................... | 445/49 |
| 2005/0168133 A1 | * | 8/2005 | Toyota et al. ............... | 313/497 |

* cited by examiner

*Primary Examiner*—Matthew S. Smith
*Assistant Examiner*—Phillip S Green

(57) ABSTRACT

A process for forming a catalyst layer for carbon nanotube growth comprising forming a catalyst layer having a first and second portion over one of a cathode metal layer or a ballast resistor layer; patterning a photoresist over the first portion; etching the second portion with a chlorine/argon plasma; removing the photoresist with an ash process; and removing the veils and preparing the surface for carbon nanotube growth with a semi-aqueous hydroxylamine solution.

8 Claims, 2 Drawing Sheets

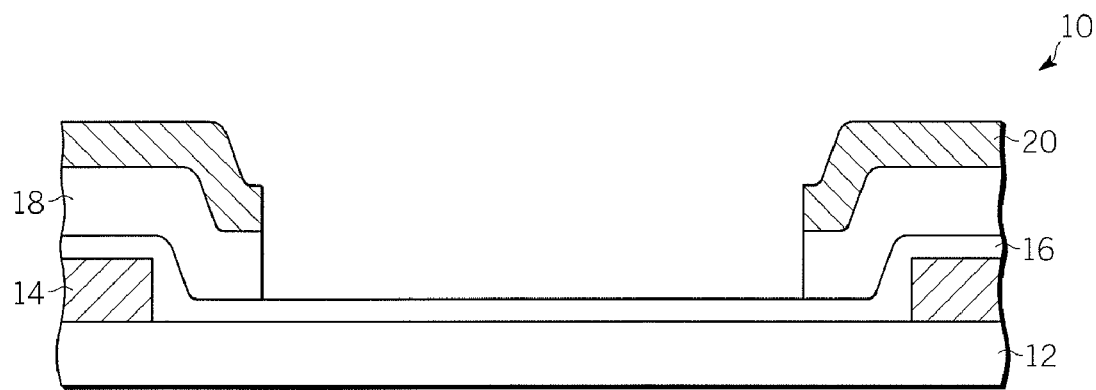
FIG. 1 —PRIOR ART—
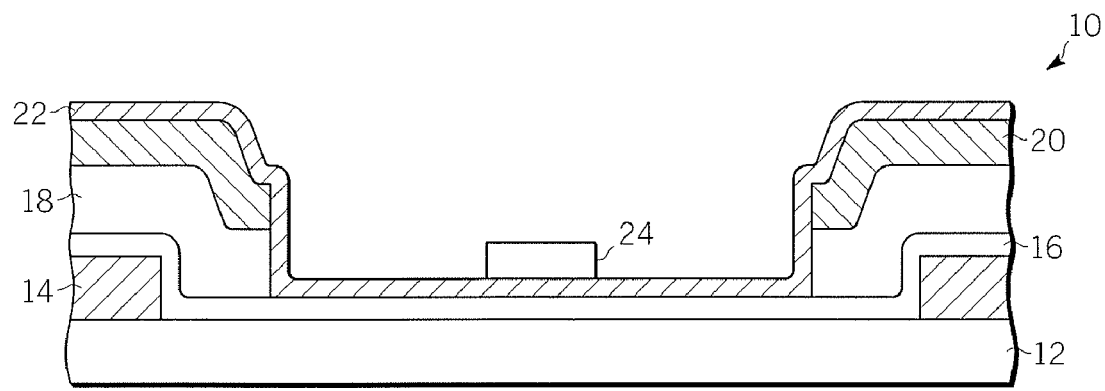
FIG. 2
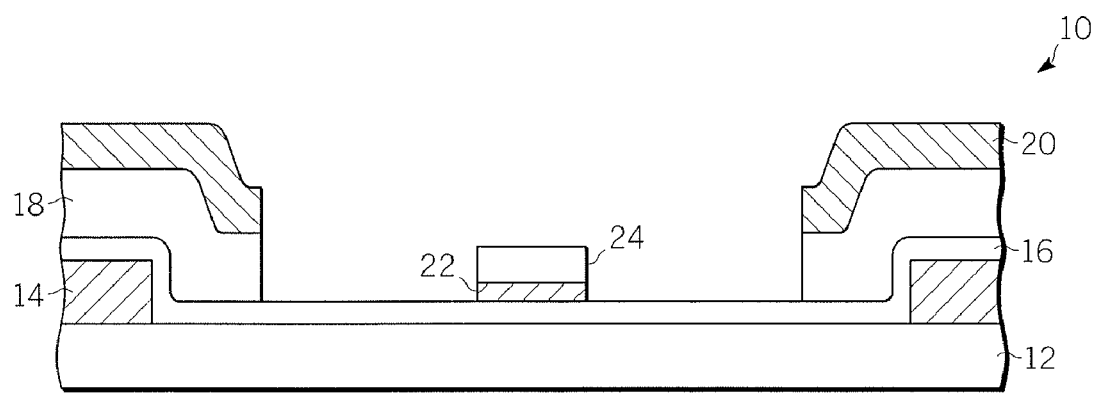
FIG. 3

PLASMA ETCH PROCESS FOR DEFINING CATALYST PADS ON NANOEMISSIVE DISPLAYS

FIELD OF THE INVENTION

The present invention generally relates to preparing a catalyst and more particularly to preparing a catalyst without residue for growing carbon nanotubes.

BACKGROUND OF THE INVENTION

Carbon is one of the most important known elements and can be combined with oxygen, hydrogen, nitrogen and the like. Carbon has four known unique crystalline structures including diamond, graphite, fullerene and carbon nanotubes. In particular, carbon nanotubes refer to a helical tubular structure grown with a single wall or multi-wall, and commonly referred to as single-walled nanotubes (SWNTs), or multi-walled nanotubes (MWNTs), respectively. These types of structures are obtained by rolling a sheet formed of a plurality of hexagons. The sheet is formed by combining each carbon atom thereof with three neighboring carbon atoms to form a helical tube. Carbon nanotubes typically have a diameter on the order of a fraction of a nanometer to a few hundred nanometers.

A carbon nanotube is known to be useful for providing electron emission in a vacuum device, such as a field emission display. The use of a carbon nanotube as an electron emitter has reduced the cost of vacuum devices, including the cost of a field emission display. The reduction in cost of the field emission display has been obtained with the carbon nanotube replacing other electron emitters (e.g., a Spindt tip), which generally have higher fabrication costs as compared to a carbon nanotube based electron emitter.

The manufacturing costs for vacuum devices (e.g., a field emission display) that use a carbon nanotube can be further reduced if the carbon nanotube is grown on the field emission substrate from a catalytic surface using chemical vapor deposition or other film deposition techniques. Nanotube growth can be conducted as a last deposition process preventing the degradation of the electron emitter properties by other device processing techniques or steps (e.g., wet processes).

Carbon nanotubes can also function as either a conductor, like metal, or a semiconductor, according to the rolled shape and the diameter of the helical tubes. With metallic-like nanotubes, it has been found that a one-dimensional carbon-based structure can conduct a current at room temperature with essentially no resistance. Further, electrons can be considered as moving freely through the structure, so that metallic-like nanotubes can be used as ideal interconnects. When semiconductor nanotubes are connected to two metal electrodes, the structure can function as a field effect transistor wherein the nanotubes can be switched from a conducting to an insulating state by applying a voltage to a gate electrode. Therefore, carbon nanotubes are potential building blocks for nanoelectronic devices because of their unique structural, physical, and chemical properties.

Existing methods for the production of nanotubes include arc-discharge and laser ablation techniques. Unfortunately, these methods typically yield bulk materials with tangled nanotubes. Recently, reported by J. Kong, A. M. Cassell, and H Dai, in Chem. Phys. Lett. 292, 567 (1998) and J. Hafner, M. Bronikowski, B. Azamian, P. Nikoleav, D. Colbert, K. Smith, and R. Smalley, in Chem. Phys Lett. 296, 195 (1998) was the formation of high quality individual single-walled carbon nanotubes (SWNTs) demonstrated via thermal chemical vapor deposition (CVD) approach, using Fe/Mo or Fe nanoparticles as a catalyst. The CVD process has allowed selective growth of individual SWNTs, and simplified the process for making SWNT based devices. However, the choice of catalyst materials that can be used to promote SWNT growth in a CVD process has typically been limited to Fe/Mo nanoparticles. Furthermore, the catalytic nanoparticles were usually derived by wet chemical routes, which are time consuming and difficult to use for patterning small features.

Another approach for fabricating nanotubes is to deposit metal films using ion beam sputtering to form catalytic nanoparticles. In an article by L. Delzeit, B. Chen, A. Cassell, R. Stevens, C. Nguyen and M. Meyyappan in Chem. Phys. Lett. 348, 368 (2002), CVD growth of SWNTs at temperatures of 900° C. and above was described using Fe or an Fe/Mo bi-layer thin film supported with a thin aluminum under layer. However, the required high growth temperature prevents integration of CNTs growth with other device fabrication processes.

Ni has been used as one of the catalytic materials for formation of SWNTs during laser ablation and arc discharge process as described by A. Thess, R. Lee, P. Nikolaev, H. Dai, P. Petit, J. Robert, C. Xu, Y. H. Lee, S. G. Kim, A. G. Rinzler, D. T. Colbert, G. E. Scuseria, D. Tomanet, J. E. Fischer, and R. E. Smalley in Science, 273, 483 (1996) and by D. S. Bethune, C. H. Kiang, M. S. de Vries, G. Gorman, R. Savory, J. Vazquez, and R. Beyers in Nature, 363, 605 (1993).

Regardless of how the nickel catalyst nanoparticles are formed, an oxidation layer forms on the catalyst nanoparticles in the ambient environment. Conventionally, hydrogen is used in the reduction phase of growth cycle, to remove the oxidation prior to growing the nanotubes. However, this must be done immediately prior to growing the nanotubes, and depending on the CNT growth technique and process conditions employed, such as thermal versus plasma enhanced, active gas composition, gas temperature, not all of the oxidation is removed. This results in a decrease of catalyst activity and in a reduction of the active site density leading consequently to the prevention of carbon nanotubes from growing on the catalyst as desired.

One known method for positioning carbon nanotubes comprises depositing the carbon nanotubes over a substrate having deep embossed holes, and shaking or vibrating the substrate until the carbon nanotubes have fallen into the holes. Another known method for positioning microtips comprises depositing a lift-off layer over a substrate with holes through the lift-off layer to the substrate. A material is deposited into the holes to form the tips with any of the material deposited onto the lift-off layer being removed when the lift-off layer is removed. Yet another known method comprises etching an emitter area into a dielectric beneath a gate layer and to a cathode layer on the substrate. A resistance layer is formed over the gate layer and on the surfaces within and around the emitter area. After etching in the emitter area to expose the cathode layer, a catalyst material is deposited on the cathode layer, followed by growth of nanotubes on the catalyst material.

Catalyst films are easily degraded by etch and clean chemistries which lead to reduced field emission and device performance characteristics. Any residual catalyst not removed leads to growth of emitters in undesired areas and leakage paths. One single nanotube or one cluster of nanotubes can render a display useless through the creation of "always on" emission sites. Such unwanted residue may also precipitate amorphous carbon during the nanotube growth process leading to leakage and shorting paths. Additionally, the presence of residue or veils (undesirable redeposition of material created by a dry etch process) from the resist operation can occlude carbon nanotube growth, thereby degrading the displays performance.

Accordingly, it is desirable to provide a process for producing a stable catalyst for carbon nanotube growth. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A process for forming a catalyst layer for carbon nanotube growth comprising forming a catalyst layer having a first and second portion over one of a cathode metal layer or a ballast resistor layer; patterning a photoresist over the first portion; etching the second portion; removing the photoresist; and removing the veils and preparing the surface for carbon nanotube growth.

BRIEF DESCRIPTION OF THE DRAWINGS

The present invention will hereinafter be described in conjunction with the following drawing figures, wherein like numerals denote like elements, and FIG. 1 is a partial cross section of a known field emission structure;

FIGS. 2 and 3 are partial cross sections of the exemplary embodiment;

DETAILED DESCRIPTION OF THE INVENTION

Figure 4:
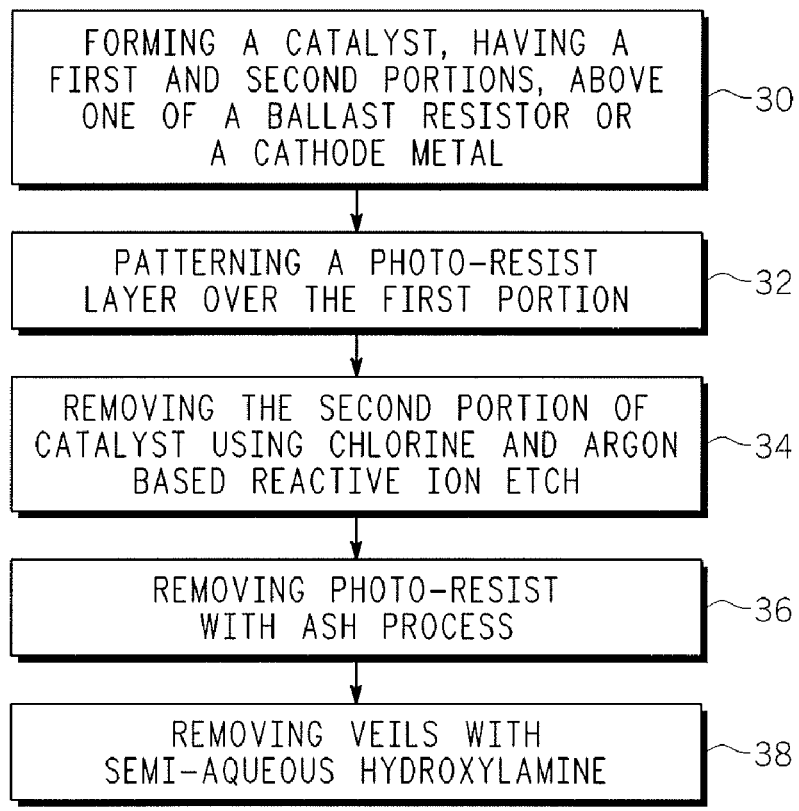
FIG. 4 is a flow chart of a fabrication process in accordance with an exemplary embodiment.

The following detailed description of the invention is merely exemplary in nature and is not intended to limit the invention or the application and uses of the invention. Furthermore, there is no intention to be bound by any theory presented in the preceding background of the invention or the following detailed description of the invention.

A method of patterning a metal catalyst pad using conventional photolithography for growing carbon nanotubes is described. The catalyst metal is plasma etched using a chlorine and argon based reactive ion etch designed to stop on an underlying ballast layer of amorphous silicon, for example. The etchant removes all of the catalyst from the substrate except as masked. The photoresist mask is removed using a multi-step cleaning process to insure the catalyst surface remains in a pristine clean state with no residue remaining which could degrade the catalyst and interfere with nanotube growth.

Referring to FIG. 1, a previously known process for forming a cathode 10, which may be used with the present invention, includes depositing a cathode metal 14 on a substrate 12. The substrate 12 comprises silicon; however, alternate materials, for example glass, ceramic, metal, a semiconductor material, an organic material, or a combination thereof are anticipated by this disclosure. Substrate 12 can include control electronics or other circuitry, which are not shown in this embodiment for simplicity. The cathode metal 14 may comprise any conductive layer, for example, a chrome/copper/chrome layer. A ballast resistor layer 16 of a semiconductor material is deposited over the cathode metal 14 and the substrate 12. A dielectric layer 18 is deposited over the ballast resistor above the cathode metal 14 to provide spacing for the gate electrode 20. The gate electrode 20 comprises a metal, preferably molybdenum. The above layers and materials are formed by standard lithographic techniques known in the industry.

Referring to FIG. 2, the catalyst 22 preferably comprises nickel, but could comprise any one of a number of other materials including cobalt, iron, and a transition metal or oxides and alloys thereof. Additionally, the catalyst 22 may be formed by any process known in the industry, e.g., co-evaporation, co-sputtering, co-precipitation, wet chemical impregnation, adsorption, ion exchange in aqueous medium or solid state, before having the present invention applied thereto. One or more ancillary layers (not shown) for altering physical properties of the catalyst 22 optionally may be formed on the ballast resistor layer 16 and gate electrode 20 prior to forming the catalyst 22.

Using conventional photoresist methods, a photoresist layer 24 is patterned on the catalyst layer 22 as shown in FIG. 2. The photoresist layer 24 material may comprise positive or negative photoresist. The known structure described in FIGS. 1 and 2 is only one structure that may be used with the exemplary embodiment of the present invention. Any structure having a catalyst formed on a ballast resistor or cathode would work equally as well.

In accordance with the exemplary embodiment, the catalyst 22 not protected by the photoresist layer (or mask) 24, is etched in a chlorine/argon based plasma. Although permutations are possible, one particular embodiment of the dry etch process comprises a microwave discharge operating at 900 watts with a bias power of 225 watts. The ratio of chlorine to argon is preferably 1:4. This dry etch step is also used to etch any ancillary layers beneath the catalyst.

Referring to FIG. 3, the photoresist layer 24 is then removed with a dry plasma ash process. Although some process latitude exists, the preferred ash conditions would produce a clean catalyst surface appropriate for growth of carbon nanotubes. Process conditions for the preferred embodiment comprise 600 watts RF power, 500 sccm oxygen, 41 sccm $N_2O$, 700 m Torr, 190° C. heated platen.

Referring to FIG. 3, the veils are then removed and the surface is prepared for carbon nanotube growth with a semi-aqueous hydroxylamine, for example, EKC-265 (a trademark of EKC Technology), at about 65° for about 10 minutes. The semi-aqueous hydroxylamine removes post-etch residues without attacking metals or oxides and allows a broad process window for wet clean processes utilizing automated wet benches and spray tools. It eases temperature variation control measures required with solutions that operate at room temperature and is water-rinseable, eliminating the need for solvent or intermediate rinsing, lowering operating costs and improving cycle times. Additionally, it has excellent bath life, is environmentally friendly, and can be disposed of easily as it is compatible with many waste streams. Semi-aqueous hydroxylamine is a low viscosity chemistry ensuring proper flow rate and compatibility with equipment and filters required in critical semiconductor manufacturing. Semi-aqueous hydroxylamine offers excellent cleaning of post-etch residues from the catalyst layer 22 without critical dimension loss and is compatible with standard TEOS, thermal oxide, BPSG, low-k materials, aluminum, titanium and tungsten, even at elevated temperatures. Process times range from 5 to 30 minutes with little effect on device structures, allowing for the selection of an optimum single process condition for all levels of cleaning.

The process of the exemplary embodiment is more specifically described in FIG. 4. A catalyst having first and second portions is formed 30 above one of a ballast resistor or a cathode. A photoresist layer is patterned 32 over the first portion. The second portion of the catalyst is removed 34 using a chlorine and argon based reactive ion etch. The photoresist is then removed 36 with an ash process. The veils are removed and the catalyst 22 surface is prepared 38 with a semi-aqueous hydroxylamine.

Figure 5:
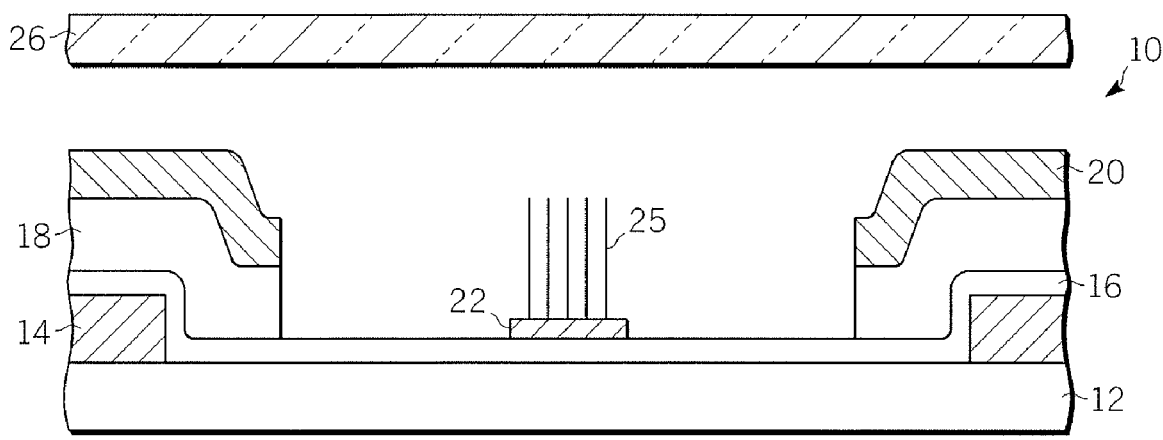
FIG. 5 is a partial cross section of the field emission structure of FIG. 1 after being subjected to the fabrication process of FIG. 4.

Referring to FIG. 5, carbon nanotubes 25 are then grown from the catalyst 22 in a manner known to those skilled in the art. Although only a few carbon nanotubes 25 are shown, those skilled in the art understand that any number of carbon nanotubes 25 could be formed. It should be understood that any nanostructure having a height to radius ratio of greater than 100, for example, would function equally well with some embodiments of the present invention.

Anode plate 26 includes a solid, transparent material, for example, glass. Typically, a black matrix material (not shown) is disposed on the anode plate to define openings (not shown) representing pixels and sub-pixels containing a phosphor material (not shown) in a manner known to those in the industry. The phosphor material is cathodoluminescent and emits light upon activation by electrons, which are emitted by carbon nanotubes 25.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A process for forming a catalyst layer for carbon nanotube growth, comprising:
   forming a catalyst layer having a first and second portion over one of a cathode metal layer or a ballast resistor layer;
   patterning a photoresist over the first portion;
   etching the second portion;
   removing the photoresist with an ash process to expose a surface of the first portion; and
   removing veils and preparing the surface with a semi-aqueous hydroxylamine solution for carbon nanotube growth.

2. The method of claim 1 wherein the etching step comprises etching with a chlorine/argon plasma.

3. The method of claim 1 further comprising growing nanostructures on the catalyst layer.

4. The method of claim 1 further comprising growing carbon nanotubes on the catalyst layer.

5. A process for forming a catalyst layer in a carbon nanotube display,
   wherein fabricating the carbon nanotube display comprises:
      forming a cathode metal over first and second portions of a substrate;
      forming a dielectric layer over the cathode metal of the first portion; and
      forming a gate electrode over the dielectric layer; and
   wherein the forming a catalyst layer comprises:
      forming the catalyst layer over the gate electrode and the second portion of the substrate;
      patterning a photoresist over part of part of the second portion;
      etching the catalyst layer not underlying the photoresist;
      removing the photoresist with an ash process to expose a surface of the catalyst layer; and
      removing veils and preparing the surface with a semi-aqueous hydroxylamine solution for carbon nanostructure growth.

6. The method of claim 5 wherein the etching step comprises etching with a chlorine/argon plasma.

7. The method of claim 5 further comprising growing nanostructures on the catalyst layer.

8. The method of claim 5 further comprising growing carbon nanotubes on the catalyst layer.

* * * * *